United States Patent [19]
Matui

[11] Patent Number: 5,942,955
[45] Date of Patent: Aug. 24, 1999

[54] QUASI-GMSK MODULATOR

[75] Inventor: Hitosi Matui, Tokyo, Japan

[73] Assignee: NEC Corporation, Japan

[21] Appl. No.: 08/919,712

[22] Filed: Aug. 28, 1997

[30] Foreign Application Priority Data

Aug. 30, 1996 [JP] Japan .................................. 8-249002

[51] Int. Cl.[6] .............................. H03C 3/00; H04L 27/12
[52] U.S. Cl. ........................... 332/101; 332/100; 375/305
[58] Field of Search ..................... 332/100, 101; 375/305

[56] References Cited

U.S. PATENT DOCUMENTS 5,022,054 6/1991 Wang .................................. 332/100 X

FOREIGN PATENT DOCUMENTS 4-23542  1/1992  Japan .

Primary Examiner—Arnold Kinkead
Attorney, Agent, or Firm—Ostrolenk, Faber, Gerb & Soffen, LLP

[57] ABSTRACT

In order to provide a digital GMSK modulator operating sufficiently stably without aliasing distortion even with a sampling rate of twice of that of input signal, a quasi-GMSK modulator of the invention comprises: integration means (105) for integrating an input signal; filtering means (106, 107) for performing a digital Gaussian filter manipulation of output of the integration means with a low sampling rate of twice or more of a data rate of the output of the integration means; a phase modulator (107, 108 and 111) for obtaining a continuous wave phase-modulated with output of the filtering means; and a limiter (112) for limiting amplitude of the continuous wave within a fixed value.

3 Claims, 8 Drawing Sheets

102 : BINARY DATA SIGNAL

305 : OUTPUT

306 : THEORETICAL OUTPUT

QUASI-GMSK MODULATOR

BACKGROUND OF THE INVENTION

The present invention relates to a signal modulator applied for digital data transmission in a mobile communication system, for example, and particularly to a GMSK (Gaussian Minimum Shift Keying) modulator having a high power efficiency, suitable to be applied for portable terminals needing low power consumption.

FIGS. 8(A) to 8(C) are schematic diagrams illustrating configurations of the GMSK modulator.

In a GMSK modulator of FIG. 8(A), a data signal 901 is processed through a Gaussian filter 902 (to be described afterwards) for restricting its frequency band, and supplied to a VCO (Voltage Controlled Oscillator) 903. A GMSK signal 904, which is a continuous radio wave having a constant envelope and frequency-modulated with a Gaussian filtered signal, namely, the data signal 901 after processing by the Gaussian filter 902, is obtained from the VCO 903. The configuration of FIG. 8(A) is basic and simple, but it is said to be difficult to apply in a small and high frequency device such as a portable terminal, because of the difficulty for of obtaining a VCO having a sufficient accuracy.

Therefore, the frequency modulation by the VCO 903 of FIG. 8(A) is replaced with a phase modulation of integration of the Gaussian filtered signal, performed by an integrator 905 and a phase modulator 906 in the configuration of FIG. 8(B), since the frequency is a differential of the phase.

Further, in the configuration of FIG. 8(C), the order of the Gaussian filter 902 and the integrator 905 of FIG. 8(B) is inverted for convenience of digital data processing, making use of a fact that the integration and the Gaussian filter operation has a linear relation.

Now, Gaussian filter operation is described, wherein signal values are normalized on a time axis for restricting frequency band.

FIG. 9 is a block diagram illustrating a Gaussian filter of four stages realized with a transversal type filter, comprising three delay elements 602, four multipliers 603 and an adder 604.

Four signal values of an input signal 601 ranged in order on a time axis are obtained at the same time by the three delay elements 602. Each of the four signal values is multiplied by each of the four multipliers 603 with each corresponding impulse response value $h_0$ to $h_3$ of the Gaussian filter to be added by the adder 604. Thus, the Gaussian filtered signal of the input signal 601 is obtained from the adder 604, normalized on the time axis, that is, in a frequency domain.

A prior example of a GMSK modulator according to the configuration of FIG. 8(C) is disclosed in a Japanese patent application entitled "Quadrature GMSK modulator", laid open as a Provisional Publication No. 23542/'92, whereof a block diagram is illustrated in FIG. 10.

Referring to FIG. 10, the prior GMSK modulator comprises;

a shift register 204 supplied with an input data signal 201, each bit thereof indicating a phase quadrant variation between $\pm\pi/2$, an up-down counter 203 for integrating logic of one of parallel outputs of the shift register 204, an n-bit counter 205 for counting pulses of a sampling clock 202 having n times the bit rate of the data signal 201, and supplying a shift signal to the shift counter at each n cycles of the sampling clock 202, a first and a second ROM (Read Only Memory) 206 and 206', read address thereof indicated by parallel outputs of the up-down counter 203, the shift register 204 and the n-bit counter 205, a first and a second D/A (Digital to Analog) converter 207 and 207', each supplied with data read-out from each of the first and the second ROM 206 and 206', and a quadrature modulator 208 for outputting a GMSK signal 209 modulated with outputs of the first and the second D/A converter 207 and 207'.

A phase angle corresponding to integration of the data signal 201 and its time variation, defining input data of the Gaussian filter 902 of FIG. 8(C), are indicated by parallel outputs of the up-down counter 203 and the shift register 204. Sampling timings are indicated by parallel outputs of the n-bit counter 205.

In the first and the second ROM 206 and 206', an in-phase value and a quadrature value of each sampling timing of the Gaussian filtered signal corresponding to the input data are prepared in respective corresponding addresses.

The in-phase value and the quadrature value are read out at each sampling timing according to the above parallel outputs, and converted into analog values by the first and the second D/A converter 207 and 207', respectively, to be supplied to the quadrature modulator 208.

Thus, a GMSK signal 209 is obtained from the quadrature modulator 208, in the prior GMSK modulator of FIG. 10.

However, frequency of the sampling clock 202, according whereto the n-bit counter 205, the first and the second ROM 206 and 206', and the first and the second D/A converter 207 and 207' operate, must be sufficiently high compared to the bit rate of the data signal 201, which results in a considerable power consumption, in the prior GMSK modulator of FIG. 10.

This is because the GMSK signal generally takes wider frequency band than other linear modulation signals, and so, a high frequency sampling, more than four times the data rate, is required in order to prevent aliasing distortion caused by digital processing.

SUMMARY OF THE INVENTION

Therefore, a primary object of the present invention is to provide a digital GMSK modulator operating sufficiently stably without aliasing distortion even with a sampling rate of twice that of the input signal, suitable to be applied for portable terminals needing low power consumption.

In order to achieve the object, a quasi-GMSK modulator of the invention comprises: integration means for integrating an input signal; filtering means for performing a digital Gaussian filter operation of output of the integration means with a low sampling rate of at least twice the data rate of the output of the integration means; a phase modulator for obtaining a continuous wave phase-modulated with the output of the filtering means; and a limiter for limiting amplitude of the continuous wave within a fixed value.

In an embodiment of the invention, the quasi-GMSK modulator comprises:

a frequency divider for providing a clock signal having the same bit rate the same as a data rate of a binary data, the sampling signal having a bit rate N times the data rate, N being an integer more than one;

a counter for counting a pulse number of the sampling signal and outputting a value modulo N of the pulse number;

an accumulator for calculating an accumulation of each binary logic of the binary data signal and outputting a value modulo 4 of the accumulation;

a shift register for outputting parallel outputs obtained by shifting output of the accumulator synchronously with the clock signal;

a memory accessed with address data designated by the parallel outputs of the shift register and output of the counter for outputting 2-dimensional data to be used for a quadrature modulation;

D/A converter for converting each component of the 2-dimensional data into each of two analog signals;

a LPF (Low Pass Filter) for eliminating higher harmonic components of each of the two analog signals;

an oscillator for generating a high frequency sine wave;

a quadrature modulator for performing quadrature modulation of the high frequency sine wave with the two analog signals; and a limiter for limiting amplitude of output of the quadrature modulator into a fixed value.

Therefore, a quasi-GMSK signal sufficiently practical is obtained in the embodiment, which can operate stably even with a sampling rate of twice the data rate, providing a quasi-GMSK modulator of low power consumption, especially suitable to be applied in portable terminals.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

In principle, the sampling rate should be sufficiently high compared to data rate for obtaining the GMSK signal by digital processing without aliasing distortion. However, the high sampling rate results in high power consumption, especially in D/A converters.

In the quasi-GMSK modulator of the invention, the amplitude variation is eliminated by providing a limiter after the quadrature modulator in order to get a constant envelop signal. Therefore, a quasi-GMSK signal which can be practically treated as the GMSK signal, is obtained in the invention even when an input signal is sampled with a sampling clock having a bit-rate only twice that of the input signal.

In the following paragraphs, the present invention will be described in connection with embodiments having a sampling rate twice the data rate of the input signal, although the sampling rate is not necessarily limited to twice the input signal, in the scope of the invention.

Figure 1:
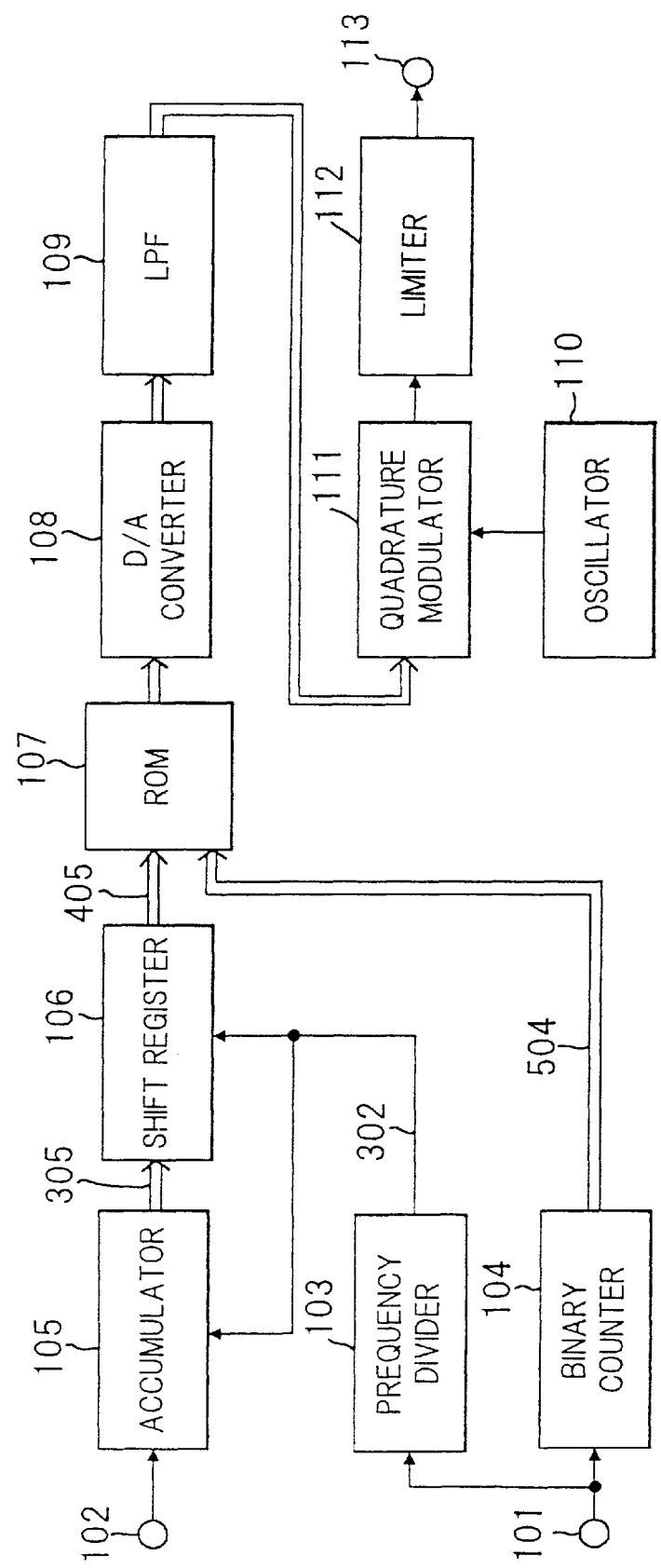
FIG. 1 is a block diagram illustrating a quasi-GMSK modulator according to an embodiment of the invention.

FIG. 1 is a block diagram illustrating a quasi-GMSK modulator according to an embodiment of the invention.

Referring to FIG. 1, the quasi-GMSK modulator of the embodiment comprises;

an accumulator 105 for outputting modulo 4 of the accumulated value of a binary data signal 102 input thereto, a shift register 106 of four stages for registering and shifting the output of the accumulator 105 into four parallel outputs, a frequency divider 103 for obtaining a clock signal to be supplied to the accumulator 105 and the shift register 106, by frequency-dividing a sampling clock 101 having a sampling rate twice the data rate of the binary data signal 102, a binary counter 104, a ROM 107 accessed with address data represented by parallel outputs of the shift register 106 and the binary counter 104, for outputting an in phase component and a quadrature component to be used for a quadrature modulation, a D/A converter 108 for converting in phase component and the quadrature component into two analog signals, respectively, a LPF (Low Pass Filter) 109 for eliminating higher harmonic components of the two analog signals, an oscillator 110 for generating a sine wave of a radio frequency, a quadrature modulator 111 for performing quadrature modulation of the output of the oscillator 110 with the two outputs of the LPF 109, and a limiter 112 for eliminating amplitude variation from the output of the quadrature modulator.

Here, in the embodiment, the binary data signal 102 is described to be represented by bit values +1 and −1.

Figure 8A:
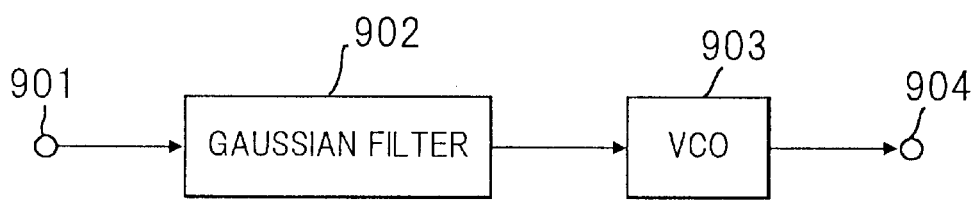
FIG. 8(A) is a schematic diagram illustrating a configuration of the GMSK modulator.
Figure 8B:
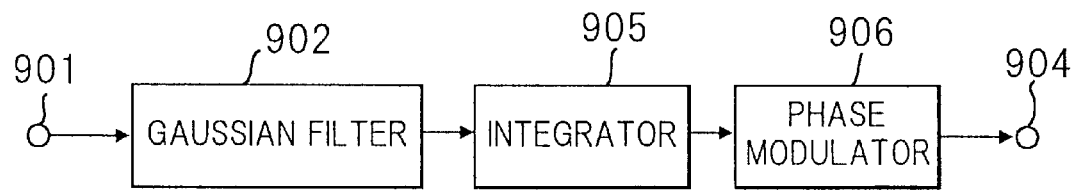
FIG. 8(B) is a schematic diagram illustrating another configuration of the GMSK modulator.
Figure 8C:
FIG. 8(C) is a schematic diagram illustrating still another configuration of the GMSK modulator.

The binary data signal 102 is accumulated in the accumulator 105. This is because phase component of the modulated signal accords to integration of its base band signal in frequency modulation such as the GMSK, as beforehand described in connection with FIG. 8(B).

Figure 2:
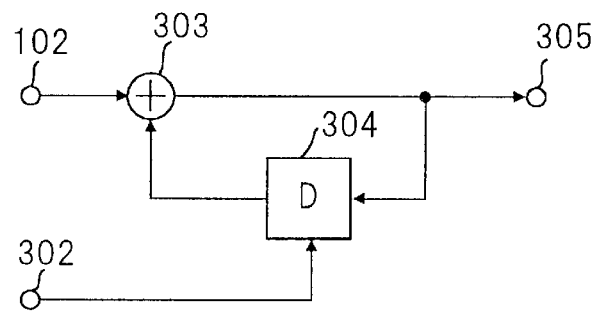
FIG. 2 is a block diagram illustrating a configuration of the accumulator 105 of FIG. 1.

FIG. 2 is a block diagram illustrating a configuration of the accumulator 105 of FIG. 1, comprising an adder 303 and a delay element 304. The binary data signal 102 is added by the adder 303 to accumulated value until one cycle before, which is fed back from output of the adder 303 through the delay element 304 controlled by a clock signal 302 supplied from the frequency divider 103.

Figure 3:
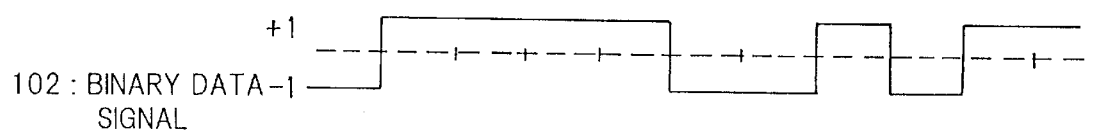
FIG. 3 is a schematic diagram illustrating input/output of the adder 303 of FIG. 2.
Figure 3:
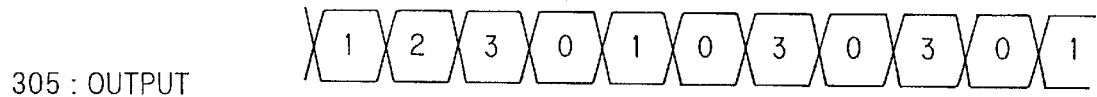
Figure 3:
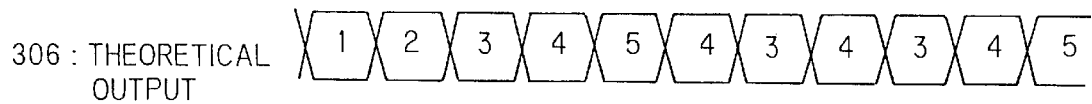

The adder 303 outputs modulo 4 of the added value as shown in the schematic diagram of FIG. 3 illustrating input/output of the adder 303. That is, according to input value of +1 or −1 of the binary data signal 102, the accumulator 105 outputs one of four values 0, 1, 2 or 3, regarding the input value −1 as 3, as follows;

$$2-1=2+3=1 \quad \text{(mod4)}$$

Theoretically, it is natural to output every possible integer, as shown with theoretical value 306 of FIG. 3, for preparing table values in the ROM 107 as will described afterwards. However, it requires consideration against overflow in addition to a wider bit width of parallel outputs of the accumulator 105, needing a larger hardware space.

On the other hand, the accumulator 105 can be designed with far simpler configuration when it is sufficient to output the modulo 4, and, in fact, it operates practically without problem, since the output of the accumulator 105 corresponds to a phase value between 0 to $2\pi$, as above described, accumulated values 0, and ±4 corresponding to a phase 0; −3, 1 and 5 to $\pi/2$, and so on.

Therefore, the binary data signal 102 is supplied as parallel inputs '01' or '11' and parallel outputs '00' to '11' are supplied to the shift register 106, in the embodiment of FIG. 1.

Figure 9:
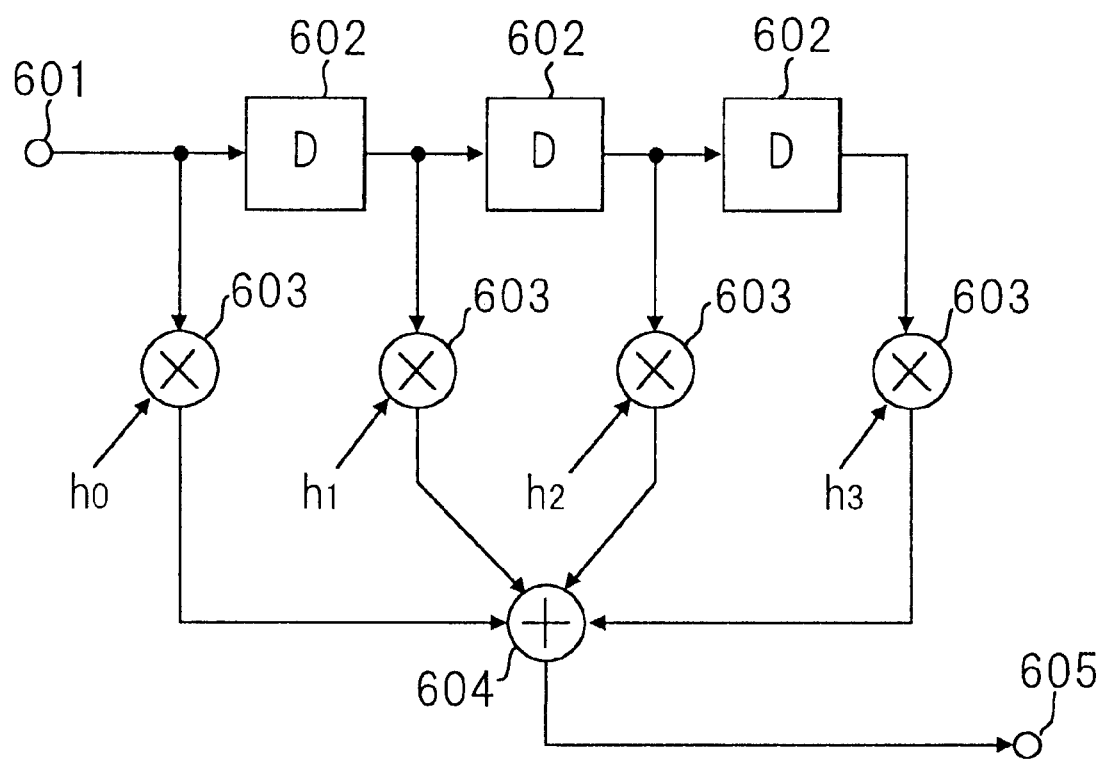
FIG. 9 is a block diagram illustrating a Gaussian filter of four stages realized by a transversal type filter.
Figure 10:
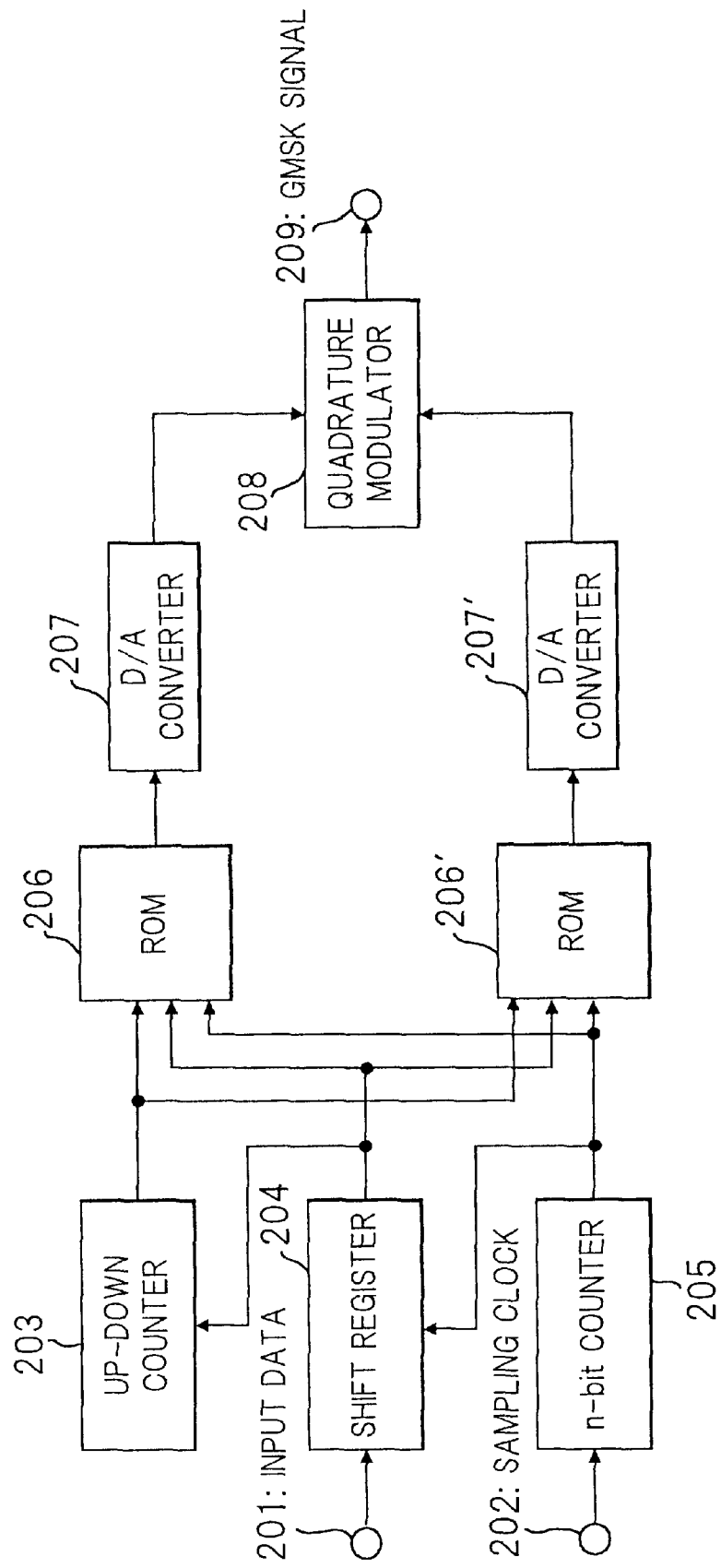
FIG. 10 is a block diagram illustrating a prior art GMSK modulator.

Now, the Gaussian filter operation will be described. A Gaussian filter of four stages realized by a transversal type filter is described in connection with FIG. 9. The three delay elements 602 of FIG. 9 are replaced with the shift register 106 of FIG. 1, and the multiplier 603 and the adder 604 are replaced with the ROM 107 for realizing the Gaussian filter, in the embodiment of FIG. 1.

Figure 4:
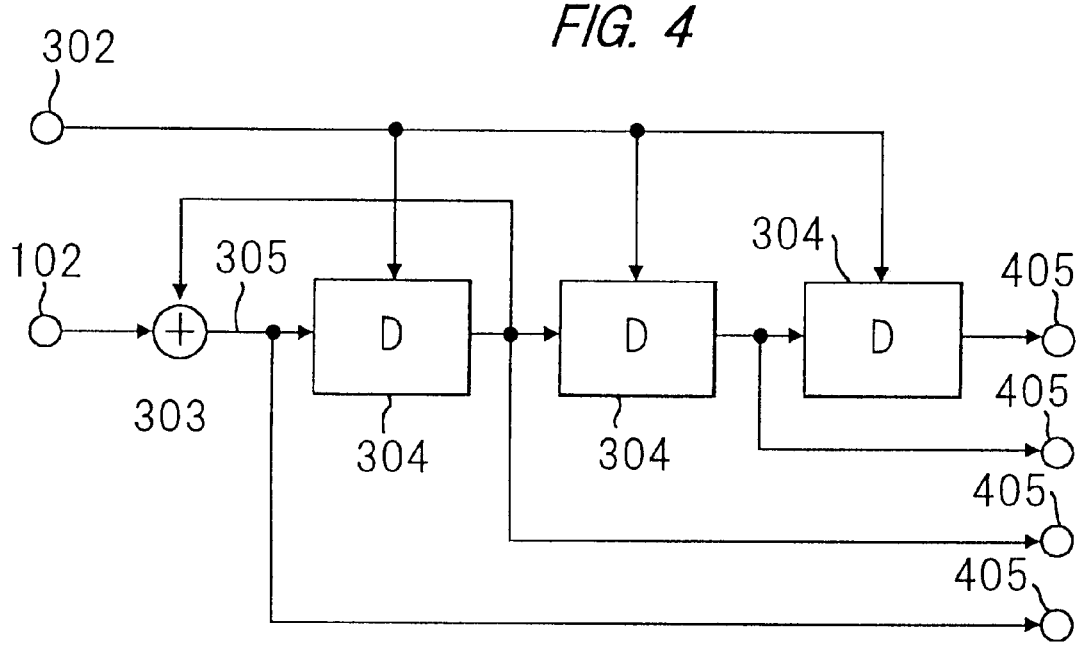
FIG. 4 is a block diagram illustrating a configuration of the shift register 106 including the accumulator 105 of FIG. 1.

FIG. 4 is a block diagram illustrating a configuration of the shift register 106 including the accumulator 105, wherein two delay elements 304 are provided in addition to the configuration of FIG. 2 operating as the accumulator 105. The three delay elements 304 clocked by the clock signal 302 are cascade-connected, and four parallel outputs 405 of two bits are obtained from outputs of the adder 303 and the three delay elements 304.

The frequency divider 103 generates the clock signal 302 by frequency-dividing the sampling signal by 2, and the binary counter 104 counts the sampling clock 101. Here, it is noted that the frequency divider 103 should divide the sampling clock by N, and the binary counter 104 should be replaced with an N-value counter, when sampling rate is N times the data rate of the binary data signal 102.

Figure 5:
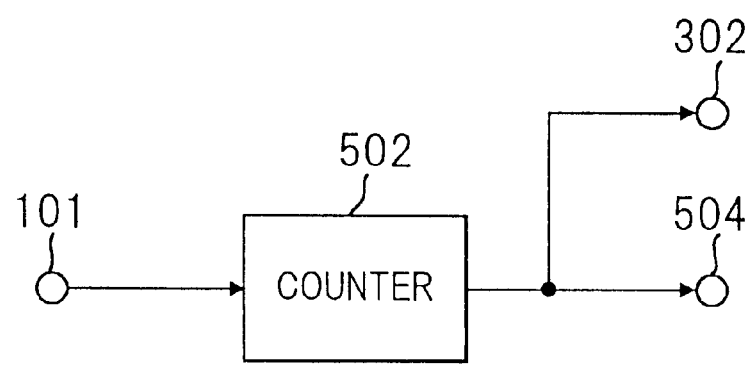
FIG. 5 is a block diagram illustrating the binary counter 104 serving as the frequency divider 103 of FIG. 1 as well.

FIG. 5 is a block diagram illustrating the binary counter 104 serving as the frequency divider 103 as well. The output of a counter 502 alternates HIGH or LOW with every rising edge of the sampling clock 101, which is supplied to the accumulator/shift register 105/106 as the clock signal 302 and also to the ROM as the LSB (Least Significant Bit) of the address data. In case of the N-value counter, logic of the MSB (Most Significant Bit) is used as the clock signal 302.

Figure 6:
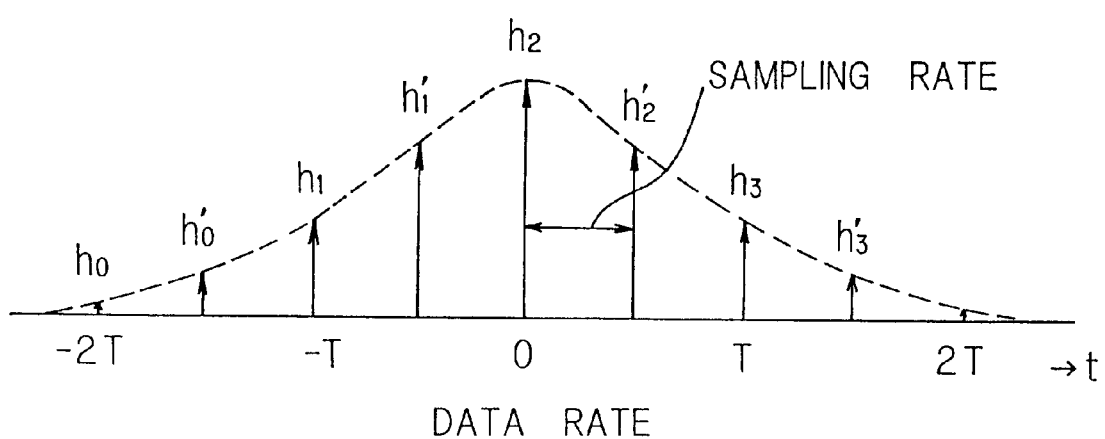
FIG. 6 is a graphic chart illustrating impulse response values $h_0$ to $h_3$ and $h'_0$ to $h'_3$.

Designated by address data of nine bits consisting of the four parallel outputs 405 of two bits from the shift register 106 and one bit output 504 of the binary counter 104, the ROM 107 outputs 2-dimensional data $(X_n, Y_n)$ and $(X'_n, Y'_n)$ alternately according to the one bit output 504, indicating in phase component and quadrature component to be used for the quadrature modulation. In addresses having upper eight bits corresponding to two bit values $(a_n, a_{n-1}, a_{n-2}, a_{n-3})$ of the four parallel outputs 405 of the shift register 106, following values of the 2-dimensional data are stored;

$$X_n = \cos(\theta_n)$$

$$Y_n = \sin(\theta_n)$$

in addresses having LSB '0', and $$X'_n = \cos(\theta'_n)$$

$$Y'_n = \sin(\theta'_n)$$

in addresses having LSB '1'; where, $$\theta_n = h_0 a_n + h_1 a_{n-1} + h_2 a_{n-2} + h_3 a_{n-3}$$

$$\theta'_n = h'_0 a_n + h'_1 a_{n-1} + h'_2 a_{n-2} + h'_3 a_{n-3},$$

coefficients $h_0$ to $h_3$ and $h'_0$ to $h'_3$ being impulse response values as shown in FIG. 6.

Here, it is noted that each of the four parallel outputs 405 of the shift register 106, namely, the output 305 of the adder 303 is expressed by modulo 4. So, the two bit values $a_n$ to $a_{n-3}$ of the four parallel outputs 405 may include discontinuous data set, such as '11', '00' or '00', '11'. Therefore, in the ROM 107, 2-dimensional data calculated with data set $(a'_n, a'_{n-1}, a'_{n-2}, a'_{n-3})$ corresponding to the theoretical outputs 306 of FIG. 3 are prepared, which can be definitely prepared as the theoretical outputs 306 and the output 306 of the adder 303, both indicating phase angles, shows 1:1 correspondence.

When each component of the 2-dimensional data is represented by eight bits, necessary memory space of the ROM 107 is about $2 \times 2^9 \times 8/8 = 1K$ bytes.

Thus, the 2-dimensional data $(X_n, Y_n)$ and $(X'_n, Y'_n)$ are output from the ROM 107 synchronously with the sampling clock 101, and converted into two analog signals to be supplied to the quadrature modulator 111 through the LPF 109 for eliminating their higher harmonic components caused by the aliasing distortion accompanying the digital processing.

As for the LPF 109, a Bessel filter is applied in the embodiment, since the Bessel filter causes little delay distortion to the Gaussian filtered signal.

Figure 7A:
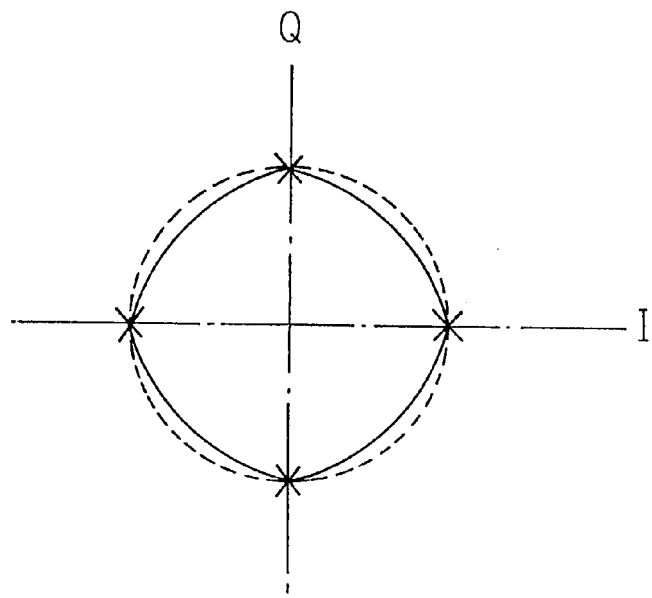
FIG. 7(A) is a schematic diagram illustrating a GMSK signal wherein amplitude variation because of aliasing distortion is included.
Figure 7B:
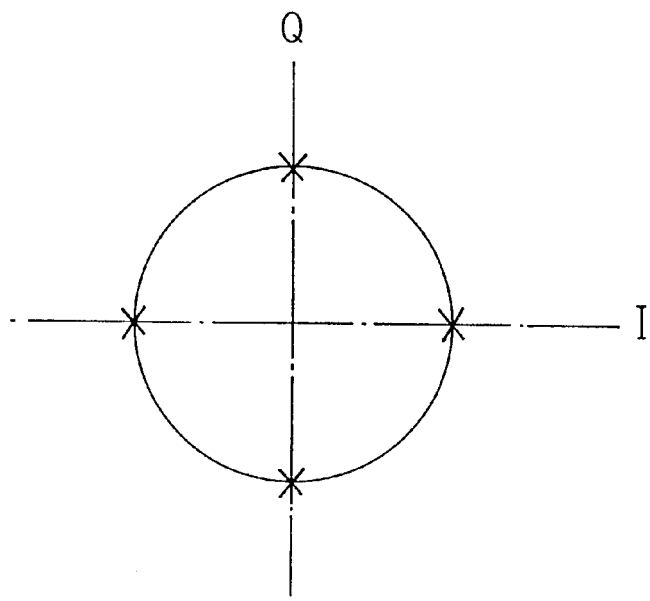
FIG. 7(B) is a schematic diagram illustrating an ideal GMSK signal.

The ideal GMSK signal has a constant envelope as shown in FIG. 7(B), as previously described. However, in output of the quadrature modulator 111, there is an amplitude variation derived by the low sampling rate, as shown in FIG. 7(A).

Therefore, the limiter 112 is provided, in the embodiment, for eliminating the amplitude variation from the output of the quadrature modulator 111. With the limiter 112, the amplitude component varying as illustrated in FIG. 7(A) is limited within a constant value as illustrated in FIG. 7(B). The limiter 112 operates as a non-linear element and brings somewhat non-linear distortion, but it is negligible when the sampling rate is about twice the data rate.

Thus, a quasi-GMSK signal sufficiently practical is obtained in the embodiment which can operate stably even with a sampling rate of twice the data rate, providing a GMSK modulator of low power consumption, especially suitable to be applied in portable terminals.

Heretofore, a quasi-GMSK modulator of the invention is described according to an embodiment. However, the scope of the invention is not limited in the embodiment. For example, the sampling rate may be three times the data bit rate of the binary data signal 102, or the counter 103 and the accumulator 105 may be provided independently of the binary/N-value counter 104 and the shift register 106.

What is claimed is:

1. A quasi-GMSK modulator, comprising:
   a frequency divider for providing from a sampling signal a clock signal having a bit rate the same as a data rate of a binary data signal, the binary data signal being represented by bit values, the sampling signal having a bit rate of N times said data rate, N being an integer more than one;

a counter for counting a pulse number of said sampling signal and outputting a value modulo N of said pulse number;

an accumulator for calculating an accumulation of each bit value of said binary data signal and outputting a value modulo 4 of said accumulation;

a shift register for outputting parallel outputs obtained by shifting an output of said accumulator synchronously with said clock signal;

a memory accessed with address data designated by said parallel outputs of said shift register and an output of said counter for outputting 2-dimensional data to be used for a quadrature modulation;

a D/A (Digital to Analog) converter for converting each component of said 2-dimensional data into each of two analog signals;

a LPF (Low Pass Filter) for eliminating high frequency components of each of said two analog signals;

an oscillator for generating a high frequency sine wave;

a quadrature modulator for performing quadrature modulation of said high frequency sine wave with said two analog signals; and a limiter for limiting amplitude of an output of said quadrature modulator into a fixed value.

2. The quasi-GMSK modulator recited in claim 1, wherein said accumulator is included in and shares a delay element with said shift register.

3. The quasi-GMSK modulator recited in claim 1, wherein said frequency divider is realized together with said counter, said clock signal obtained from logic of MSB (Most Significant Bit) of an output of said counter.

* * * * *